United States Patent [19] | [11] 4,297,403
Smith | [45] Oct. 27, 1981

[54] CORELESS PRESSURE SENSITIVE LABEL SUPPLY ROLL

[75] Inventor: Thomas M. Smith, Dayton, Ohio

[73] Assignee: Monarch Marking Systems, Inc., Dayton, Ohio

[21] Appl. No.: 119,123

[22] Filed: Feb. 6, 1980

[51] Int. Cl.[3] .......... B32B 3/16; B32B 7/06

[52] U.S. Cl. .......... 428/42; 156/184; 428/121; 428/906

[58] Field of Search .......... 428/40, 906, 41, 42, 428/121; 156/184

[56] References Cited

U.S. PATENT DOCUMENTS

| | | | |
|---|---|---|---|
| 3,202,566 | 8/1965 | Schur | 428/124 |
| 3,776,644 | 12/1973 | Baker | 428/121 X |
| 3,804,698 | 4/1974 | Kinloch | 428/121 X |
| 3,960,272 | 6/1976 | Hartbauer et al. | 156/184 X |
| 4,081,309 | 3/1978 | Jenkins | 428/42 X |
| 4,116,747 | 9/1978 | Hamisch, Jr. | 156/577 X |

*Primary Examiner*—Henry F. Epstein

*Attorney, Agent, or Firm*—Jacox & Meckstroth

[57] ABSTRACT

A coreless supply roll of pressure sensitive labels includes an elongated paper carrier web which has a release coating on one side and is dye cut to provide longitudinally spaced feed holes adapted to receive a tooth feed wheel of a label printing and applicating device. The coated side of the carrier web supports a label web which is releasably attached to the carrier web by pressure sensitive adhesive and is dye cut to define distinct labels adapted to be successively printed and peeled from the carrier web within the device. The carrier web has an inner wrap or convolution which defines a center opening for the roll, and the inner convolution has a first end section which is folded back over a radially underlying second end section. A spot of permanent adhesive bonds the uncoated side of the first end section of the carrier web to a radially overlying portion of the uncoated side of the carrier web to provide the composite web with a positively connected end loop.

9 Claims, 4 Drawing Figures

CORELESS PRESSURE SENSITIVE LABEL SUPPLY ROLL

BACKGROUND OF THE INVENTION

In the operation of apparatus or a device for successively printing and applying pressure sensitive labels such as, for example, the hand-held labeler disclosed in U.S. Pat. No. 4,116,747, which issued to the assignee of the present invention, it is common to use a coreless label supply roll wherein a paper carrier strip or web has a release coating on one side for supporting a paper label web attached by pressure sensitive adhesive. The carrier web is die cut at longitudinally spaced intervals to provide openings for receiving the teeth of a feed wheel which is indexed to advance the composite carrier and label web through the label printing and applicating device after each label is printed. The label web has laterally extending die cuts at longitudinally spaced intervals to form distinct pressure sensitive labels which may also be preprinted with common information.

A typical coreless pressure sensitive label supply roll has an inner wrap or convolution which defines a center opening for the supply roll. The center opening is adapted to receive a support shaft or a pair of opposing roll support core plugs, for example, as disclosed in U.S. Pat. No. 4,081,309 which issued to the assignee of the present invention. To retain the inner end portion of the composite label and carrier web, commonly a spot of glue is placed on the label at the inner end of the composite web to attach the label to the radially overlying carrier web. When the adhesive dries, it forms a stronger bond than the bond formed by the pressure sensitive adhesive which attaches the end label to the coated side of the underlying carrier web.

It has been found that when the label supply roll is depleted or exhausted, the carrier web feed wheel in the label printing and applying device, pulls on the carrier web with sufficient force to cause the label at the inner end of the supply roll to be separated from the release coating on the carrier web. The trailing end portion of the composite web then continues feeding through the label printing and applying device with the separated label being carried on the underneath side of the carrier web with its pressure sensitive adhesive exposed to guide surfaces and guide rolls within the device. This exposed pressure sensitive adhesive on the label significantly increases the possibility of a portion of the label attaching to one or more internal components within the device, thereby preventing continued dependable operation of the device.

SUMMARY OF THE INVENTION

The present invention is directed to an improved coreless pressure sensitive label supply roll which eliminates the problem discussed above and significantly increases the operational reliability of a label printing and applying device. In general, a label supply roll constructed in accordance with the invention, includes a series of pressure sensitive labels which are releasably attached to a coated side of a carrier strip or web to form a composite web. The composite web has an inner wrap or convolution, and the inner end portion of the composite web includes a first end section which extends from and is folded back over a radially underlying second end section. Thus an uncoated side of the carrier web in the first end section opposes a radially overlying portion of the same uncoated side of the carrier web.

A spot of permanent adhesive attaches the opposing uncoated sides of the carrier web and thereby forms a positive closed loop with the inner end portion of the composite web. When the label supply roll is exhausted within the printing device, the closed inner loop has sufficient strength to resist the pulling force exerted by the feed wheel or web advancing mechanism. In accordance with a modification, the adhesive spot connecting the opposing portions of the carrier web may be made so that the loop becomes disconnected in response to the pulling force, and the trailing end portion of the composite web continues to feed through the label printing device. Since the spot of adhesive is dry, the adhesive does not affect or jam the operation of the printing device and feeds through the device on the trailing end portion of the carrier web.

Other features and advantages of the invention will be apparent from the following description, the accompanying drawing and the appended claims.

DESCRIPTION OF THE PREFERRED EMBODIMENT

Figure 1:
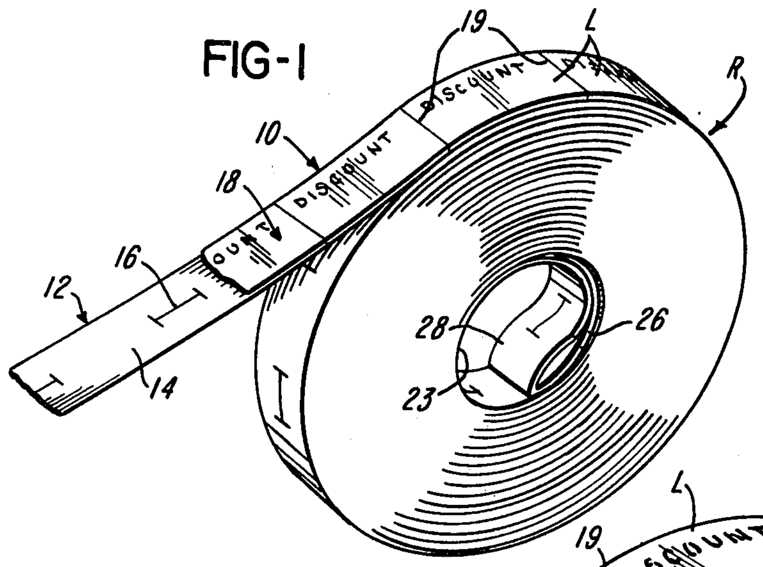
FIG. 1 is a perspective view of a coreless pressure sensitive label supply roll constructed in accordance with the invention.

FIG. 1 illustrates a coreless pressure sensitive label supply roll R formed by winding a composite web assembly 10. The web assembly 10 includes an elongated carrier strip or web 12 having an outer surface 14 coated with a release material such as silicone. A series of I-shaped die cuts 16 are formed within the carrier web 12 at longitudinally spaced intervals to provide openings for receiving the teeth on a drive wheel of a step-by-step advancing mechanism within a label printing and applicating device such as the hand-held labeler disclosed in above-mentioned U.S. Pat. No. 4,116,747. While the die cuts 16 are illustrated as being I-shaped in configuration, it is to be understood that the carrier web 12 may have die cuts or holes of another shape.

The coated paper carrier web 12 supports an elongated paper label strip or web 18, and the underneath surface of the label web is coated with pressure sensitive adhesive which contacts the release coating on the carrier web 12. The paper label web 18 has a series of longitudinally spaced and laterally extending die cuts 19 which extend only through the label web 18 to the carrier web 12 and define a series of pressure sensitive labels L. The labels L may be preprinted with common information as shown in FIG. 1.

Figure 2:
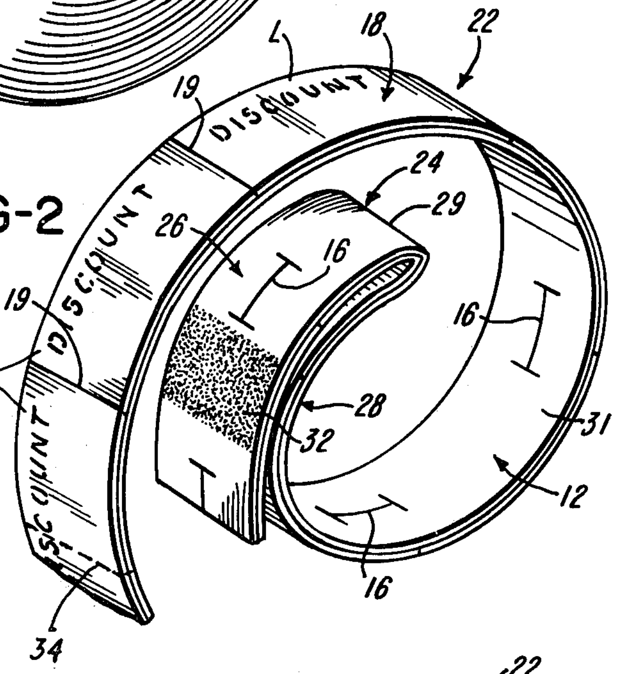
FIG. 2 is an enlarged exploded perspective view of the inner wrap or convolution of the label supply roll shown in FIG. 1.
Figure 3:
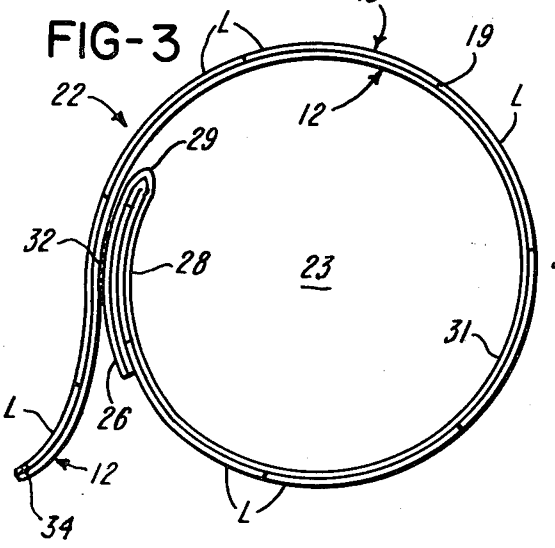
FIG. 3 is an enlarged elevational view of the inner convolution of the label supply roll shown in FIG. 1.

The web assembly 10 has an inner end portion which forms an inner wrap or convolution 22 for the roll R and (FIG. 2) defines a substantially cylindrical center opening 23. The center opening 23 is adapted to receive either a rotary or stationary roll support shaft or plug, for example, as disclosed in above-mentioned U.S. Pat. No. 4.081,309. The inner end portion or convolution 22 of the web assembly 10 includes a folded end portion 24 which forms a first end section 26 extending from an underlying second end section 28 and defines a folded edge 29. As shown in FIG. 2, the uncoated side 31 of the paper carrier web 12 of the first end section 26 opposes an adjacent overlying portion of the uncoated side of the carrier web 12, and a patch or spot of permanent or non-pressure adhesive 32 bonds together the opposing surfaces of the carrier web 12. A line of perforations 34 extends laterally across the composite web 10 and is located a short distance upstream of the adhesive 32.

Figure 4:
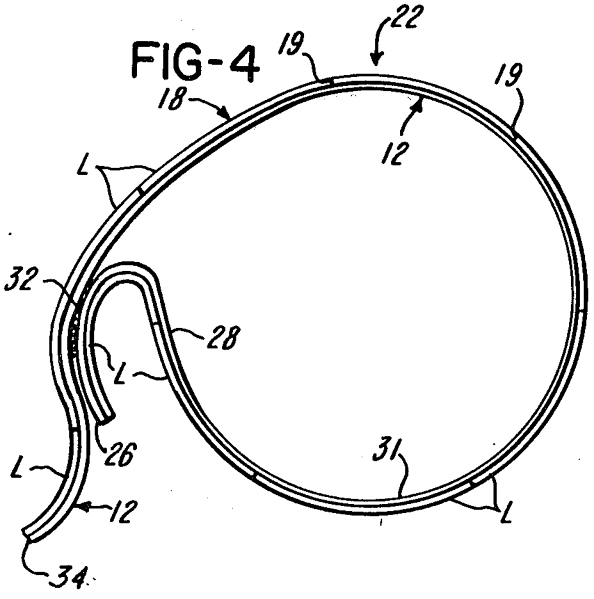
FIG. 4 is an enlarged elevational view similar to FIG. 3 and illustrating the configuration of the inner convolution in response to a pulling force applied to the inner convolution when the supply roll is exhausted and requires replacing.

The spot of adhesive 32 provides a positive bond between the uncoated adjacent surfaces of the carrier web 12, and this bond is substantially stronger than the bond between the labels L and the coated surface 14 of the carrier web as provided by the pressure sensitive adhesive. When the composite web assembly 10 is pulled by the web feed mechanism when the supply roll is exhausted, the inner convolution 22 of the web assembly 10 maintains a positively connected loop in the end of the composite web assembly, as shown in FIG. 4. This loop provides sufficient resistance to the web feed or advancing mechanism within the label printing device to sever the composite web 10 at the line of perforations 34 and to provide an indication that the supply roll is depleted or exhausted. The looped end portion of the composite web 10 may then be retracted from the label printing device so that a new or fresh label supply roll may be inserted into the device.

As mentioned above, the spot of permanent or non-pressure sensitive adhesive 32 may also be selected to provide a temporary and releasable bond between the opposing uncoated surfaces of the carrier web 12 so that when the supply roll is exhausted and the web assembly 10 is pulled, the looped inner convolution 22 will release. The trailing or inner end portion of the composite web assembly 10 may then be fed through the label printing device. Since the adhesive 32 is dry, it will not transfer to any of the web guide surfaces or guide rollers within the printing device and thus will not affect the dependable operation of the device over an extended period of time.

While the label supply roll and its method of construction herein described constitute a preferred embodiment of the invention, it is to be understood that the invention is not limited to the precise roll construction and method described, and that changes may be made therein without departing from the scope and spirit of the invention as defined in the appended claims.

The invention having thus been described, the following is claimed:

1. A coreless pressure sensitive label supply roll comprising a series of pressure sensitive labels releasably bonded by pressure sensitive adhesive to a releasable surface of an elongated carrier web, the assembly of the carrier web and labels being wound into a supply roll adapted to be used in a label printing and applicating device where the labels are successively printed and then successively peeled from the carrier web, the carrier web having an inner convolution defining a center opening, the inner convolution of the carrier web having a folded end portion forming a first end section extending from and folded back over a radially underlying second end section, and means connecting the first end section of the carrier web to a radially overlying portion of the carrier web to provide the carrier web with a connected loop forming the inner end of the carrier web.

2. A coreless pressure sensitive label supply roll comprising a series of pressure sensitive labels releasably bonded by pressure sensitive adhesive to a releasable coated surface of an elongated carrier web, the carrier web and labels forming a composite web wound into a supply roll adapted to be used in a label printing and applicating device where the labels are successively printed and then successively peeled from the carrier web, the composite web having an inner convolution defining a center opening, the inner convolution of the composite web having a folded end portion forming a first end section extending from and folded back over a radially underlying second end section, and means bonding the first end section of the composite web to a radially overlying portion of the composite web to provide the composite web with a connected loop forming the inner end portion of the composite web.

3. A coreless pressure sensitive label supply roll comprising an elongated carrier web, a coating of releasable material on one side of the carrier web, an elongated label web releasably bonded by pressure sensitive adhesive to the coated side of the elongated carrier web, the carrier web having longitudinally spaced transverse die cuts defining a series of pressure sensitive labels, the assembly of the carrier web and labels being wound into a supply roll adapted to be used in label printing and applicating device where the labels are successively printed and then successively peeled from the carrier web, the assembly of the carrier web and labels having an inner convolution defining a center opening, the inner convolution of the assembly having a folded end portion forming a first end section extending from and folded back over a radially underlying second end section, and adhesive means bonding the other side of the carrier web within the first end section to a radially overlying portion of the other side of the carrier web to form a connected loop with the inner convolution of the assembly of the carrier web and labels.

4. A coreless pressure sensitive label supply roll comprising an elongated paper carrier web, a coating of releasable material on one side of the carrier web, means for defining longitudinally spaced openings within said carrier web, an elongated paper label web releasably bonded by pressure sensitive adhesive to the coated side of the elongated carrier web, the paper carrier web having longitudinally spaced transverse die cuts defining a series of pressure sensitive labels, the carrier web and labels forming a composite web wound into a supply roll adapted to be used in a label printing and applicating device where the labels are successively printed and then successively peeled from the carrier web, the composite web having an inner convolution defining a center opening, the inner convolution of the composite web having a folded end portion forming a first end section extending from and folded back over a radially underlying second end section, and adhesive means bonding the other side of the carrier web within the first end section to a radially overlying portion of the other side of the carrier web to provide the composite web with a connected loop formed by the inner convolution of the composite web, and means defining a line of weakening within the composite web and effective to separate the composite web from the loop in response to pulling of the composite web by a web feed mechanism in the device when the supply roll is exhausted.

5. A method of making a coreless pressure sensitive label supply roll, comprising the steps of releasably bonding a series of pressure sensitive labels with pressure sensitive adhesive to a releasable surface of an elongated carrier web to form a composite web, winding the composite web into a supply roll with the carrier web forming an inner convolution, the supply roll adapted to be used in a label printing and applicating device where the labels are successively printed and then successively peeled from the carrier web, folding the inner convolution of the carrier web to form a first end section extending from and folded back over a radially underlying second end section, and connecting the first end section of the carrier web to a radially overlying portion of the carrier web to provide the carrier web with a connected inner loop forming a center opening for the roll.

6. A method of making a coreless pressure sensitive label supply roll, comprising the steps of releasably bonding an elongated paper label web with pressure sensitive adhesive to a releasable coating on one side of an elongated carrier web to form a composite web, die-cutting the paper label web at longitudinally spaced intervals to form a series of pressure sensitive labels, winding the composite web into a supply roll with the composite web forming an inner convolution, the supply roll adapted to be used in a label printing and applicating device where the labels are successively printed and then successively peeled from the carrier web, folding the inner convolution of the composite web to form a first end section extending from and folded back over a radially underlying second end section, and adhesively bonding the other side of the carrier web in the first end section to a radially overlying portion of the other side of the carrier web to provide the composite web with a connected loop forming a center opening for the roll.

7. A coreless pressure sensitive label supply roll as defined in claim 1 or 2 or 3 wherein the first end section of the web is attached to the radially overlying portion of the web by an adhesive effective to release the first end section from the overlying web portion in response to a predetermined pull on the carrier web when the supply roll is exhausted.

8. A method as defined in claim 5 wherein the first end section is connected to the radially overlying portion of the carrier web by bonding the first end section with an adhesive effective to release the first end section from the overlying web portion in response to a predetermined pull on the carrier web when the supply roll is exhausted.

9. A method as defined in claim 6 and including the step of forming a line of weakening within the composite web ahead of the loop to provide for separating the composite web from the loop in response to pulling the composite web when the supply roll is exhausted.

* * * * *